July 2, 1946.  F. E. PAYNE  2,403,298
SEAL
Filed Feb. 15, 1944
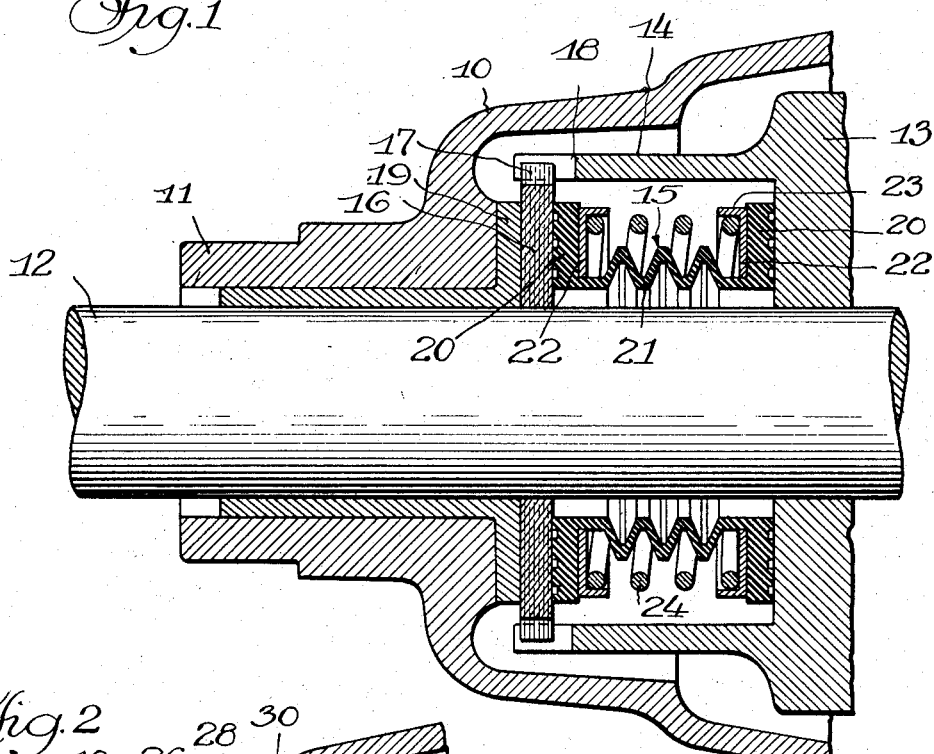
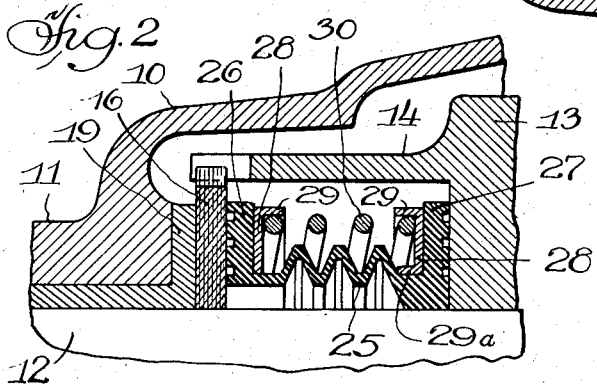
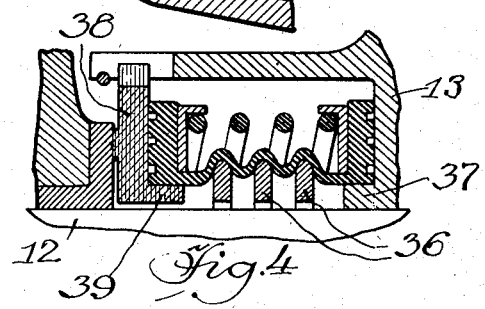
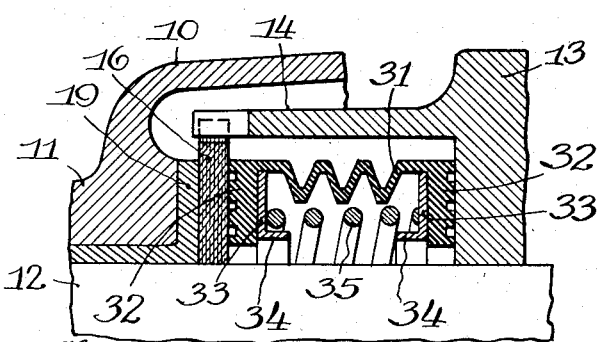
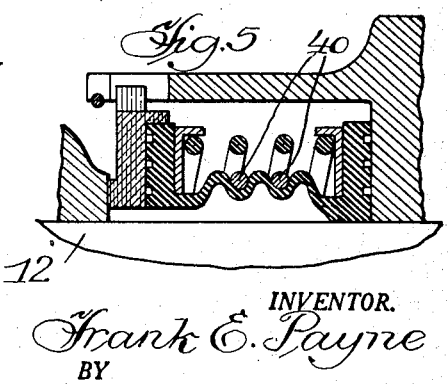
INVENTOR.
Frank E. Payne
BY
Chritton, Wiles, Davies, Schroeder & Merriam, Attys.

Patented July 2, 1946

2,403,298

UNITED STATES PATENT OFFICE 2,403,298

SEAL

Frank E. Payne, Chicago, Ill., assignor to Crane Packing Company, Chicago, Ill., a corporation of Illinois Application February 15, 1944, Serial No. 522,405

4 Claims. (Cl. 286—11)

My invention relates to improvements in seals of the type in which a rubber-like cylindrical member or sleeve is provided, having end flanges connected by a bellows-shaped portion. The outer faces of the flanges constitute sealing surfaces. The inner faces thereof are engaged by the ends of a helical spring which surrounds the bellows portion and presses said flanges apart to distend the sleeve as a whole.

In one such seal the end flanges are provided with shoulders or seats, with the coiled spring positioned by said seats. With this arrangement it is necessary to grind the ends of the helical spring with a gradual taper to provide something approaching flat surfaces, in order to distribute the pressure fairly uniformly around the flanges. This flat ring-like end area does not in fact constitute a complete circle but has a slight gap in it.

One object of my invention is to provide an improved sealing assembly in which the pressure exerted by the ends of the helical spring is uniformly distributed around the inner faces of the flanges by means of washers or the like. Another object is to make available the maximum area of contact between the washers and said flanges by uniting the bellows with the end flanges as far from the periphery of the latter as possible.

Other objects and advantages will be apparent from the description subsequently given.

In the accompanying drawing I have illustrated several embodiments of the invention.

Fig. 1 is a sectional view of part of a water pump with the seal mounted therein.

Fig. 2 is a sectional elevation of another form of seal.

Fig. 3 is a section of another modification.

Figs. 4 and 5 are additional modifications.

The sealing member is adapted for a wide variety of uses, as for example, water pumps of automobiles, oil pumps, fuel pumps, oil seals and grease seals. A water pump housing of more or less conventional design is indicated by 10. It has a cylindrical bearing member 11 projecting at one end in which the shaft 12 is rotatably mounted. The impeller 13 may be of any suitable form. It has preferably a projecting flange 14 forming an annular recess in which the sealing member 15 is mounted. The other side of the recess is closed by a sealing ring or centrally apertured disk 16 of anti-friction material as for example carbon or a phenol condensation product. Said ring has the usual radial ears or projections 17 thereon, which engage in recesses 18 in the flange 14 to insure rotation of the sealing member when the shaft rotates. Said sealing member is yieldingly pressed against said ring 16 at one end, and against the parallel wall at the other end of said recess, and turns therewith. The smooth hard surface of said ring 16 slides against the adjacent smooth stationary surface of the bearing 19 or some other sealing surface at right angles to the axis of the shaft and prevents leakage of water or other liquid.

The sealing member comprises end flanges 20 connected by a flexible bellows-shaped wall 21, both parts being made preferably of rubber or some synthetic composition which will not deteriorate when in contact with the fluid to be sealed and under the temperatures at which the seal is to operate. The end flanges are integrally united with the ends of the bellows near the inner margins of said flanges so as to leave the maximum area of the flanges, i. e. the complete inner faces of said flanges, available to serve as a seat for the washers or ferrules, 22—22.

The washers have their outer peripheries spun over at 23 to provide stops or restraining flanges. The helical spring 24 has its ends ground approximately flat and is fitted against said washers 22—22 to press the end flanges apart. The sleeve being made of flexible material, it may be deformed to permit said washers and helical spring to be slipped over it. Said washers, as shown in Fig. 1, cover substantially the entire inner faces of the end flanges and extend inwardly to the line of junction of said end flanges and the bellows seal. The spring is prevented from moving out of its intended position by the spun over flanges 23.

With this arrangement, substantially uniform pressure against the inner faces of the flanges is assured. This design also permits use of wider washers which insure better sealing of the flanges under pressure, in addition to increasing the sealing area. With certain prior devices, lack of uniform pressure outwardly in a longitudinal direction resulted in incomplete sealing against leakage.

In the form of device shown in Fig. 2, the sleeve has an opening of sufficient diameter to clear the shaft. However, the seal may be made of somewhat tapering form, with one end in contact with and rotating with the shaft. Such a modified form is shown in Fig. 2.

In this figure, the bellows member 25 has an opening through it which is smaller at one end than at the other, and it engages the shaft at the small end with a tight or preloaded fit. Flanges 26, 27 are provided which are similar to those previously described except that the opening through flange 26 is larger than through flange 27. The washers 28, and the helical spring 30 are also quite similar to those described in connection with Fig. 1. It will be noted that inturned edge 29a is in contact with the cylindrical portion of the sleeve adjacent flange 28. It is contemplated that said edge 29a will exert a compressive force upon the portion of the bellows member in contact with the shaft to effect a seal thereat.

In both forms of device the end flanges may be twice as wide, more or less, as those shown in the drawing and correspondingly larger washers may be employed to control leakage with much higher pressures.

With both forms of invention described, a tight seal may be maintained, not only in the case of water but in the case of other liquids, such for example, as aromatic gasoline used in aeroplanes. Although the particular pump, in connection with which the seal is illustrated, requires that the seal itself rotate with the shaft, the arrangement may be reversed to provide a non-rotatable seal, pressing a non-rotatable sealing ring against a rotating surface.

In Fig. 3 the bellows 31 has its end flanges 32—32 on the inside. Washers 33 having turned over edges 34 fit against these flanges as in the case of the other forms illustrated, except said washers are on the inside instead of the outside of the seal. A helical spring 35 is also employed, the ends of which bear against said washers to distribute the pressure over said flanges.

Figs. 4 and 5 show added features in the way of reenforcing devices to prevent undue enlargement or deformation of the bellows under higher pressures than normal.

In Fig. 4 I have shown rings 36 which, for example, may be made of metal and which are fitted within the convolutions of the bellows, and which have openings large enough to clear the shaft. The peripheries of these rings are preferably rounded to correspond approximately to the curvature of the folds in the bellows. Not only do they resist external pressure such as would tend to collapse the bellows, but they also act as centralizers. These rings, as will be apparent, do not interfere with the flexing of the bellows during its normal operation. The bellows seals of this general character usually operate at maximum pressures, or twenty-five to thirty-five pounds per square inch, but with these reenforcing rings pressures as high as one hundred pounds or even fifty per cent to one hundred per cent above this pressure may be used. An additional centralizing means 37 may be used to position one end of the bellows. The sealing ring 38 has an annular flange or lip 39 which constitutes a centralizing ring for the other end of said bellows. The means 37 and flange 39 insure that the bellows as a whole may maintain a concentric position with respect to said shaft. Where certain types of synthetic rubber are used, deformation of the bellows under pressure to the point where they touch the shaft will cause the bellows to "freeze" to the shaft permanently, thereby destroying the effectiveness of the bellows to expand and contract axially as required. The rings, by maintaining the bellows in spaced relation to the shaft, prevent this undesirable result from occurring.

Fig. 4 corresponds in general to Fig. 1 in that both ends of the seal are out of contact with the shaft. The modification shown in Fig. 5 corresponds in general to Fig. 2, in which one end of the bellows has a tight fit on the shaft. In Fig. 5 the bellows is assumed to be under an internal pressure which, if excessive, tends to enlarge it and deform it considerably. The pressure resisting or reinforcing rings in this case are arranged to surround the convolutions of the bellows instead of being arranged inside of the same. Said rings may have substantially the same cross sectional appearance as those in Fig. 4 except that the inner peripheries are rounded instead of the outer peripheries or they may have a circular cross section such as shown at 40. They may, for example, be made out of wire stock with the ends welded together to form endless rings. Such rings may be used to resist either inside or outside pressure.

The means 37 shown in Fig. 4 may be a separate independent ring, although it is preferably formed as a flange which is integral with the adjacent wall of the impeller 13.

It will be understood that any one or more of the various rings shown in Figs. 4 and 5 may be used in connection with the particular seals illustrated in the other figures of the drawing.

Various other changes may be made in the several illustrated embodiments shown, within the scope of the appended claims.

I claim:

1. The combination with a rotatable shaft, of an annular chamber surrounding the same, a rubber-like bellows member surrounding said shaft and in engagement therewith at one end, a flange integrally united with said end, the other end clearing said shaft and having a similar flange formed as a part thereof, a helical spring surrounding said bellows member between said flanges, and washers between said flanges and said spring and extending inwardly to the point of juncture of said flanges and bellows member, the washer at the said one end compressing that end upon the shaft to form a fluid-tight seal thereat.

2. A sealing apparatus for effecting a seal between relatively rotatable elements comprising a tubular sleeve of resilient compressible material, said sleeve having spaced radially disposed flanges, a central portion having at least one expansible fold, and substantially cylindrical portions connecting the central portion to the flanges; resilient means compressed between the flanges and tending to expand the central portion through the intermediary of the flanges and connecting cylindrical portions, and rigid washers interposed between the resilient means and flanges, one of said washers having axially turned edges, the outer edge serving to center the resilient means and the inner edge operating upon the cylindrical portion to exert a compressive force thereon, whereby to effect a seal between the cylindrical portion and one of said relatively rotatable elements.

3. A sealing apparatus comprising a sleeve of resilient compressible material such as synthetic rubber possessing the characteristic of adhering to metal when pressed against the metal for substantial periods of time, a metal element in the sleeve, said sleeve having annular ends and an intermediate region having at least one fold, means for fixing one end of the sleeve axially and for extending the other end relative to the fixed end, whereby to make necessary an axial movement of the fold, and an independent annular member intermediate the metal element and fold to keep the fold spaced from the metal element and thus prevent said fold from adhering to the metal element and to insure freedom of movement to the fold.

4. A sealing apparatus for effecting a seal between relatively movable elements comprising a tubular sleeve of resilient compressible material said sleeve having spaced radially outwardly disposed flanges, an axially expansible central portion, and substantially cylindrical portions connecting the central portion to the flanges; resilient means surrounding the central portion and compressed between the flanges to tend to expand the central portion through the intermediary of the flanges and connecting portions, and rigid washers interposed between the resilient means and flanges, one of said washers having an axially turned inner edge which operates upon one cylindrical portion to exert a compressive force thereon, whereby to effect a seal between the cylindrical portion and one of said relatively movable elements.

FRANK E. PAYNE.